US012790988B2

(12) United States Patent
Tanaka et al.

(10) Patent No.: US 12,790,988 B2
(45) Date of Patent: Nov. 10, 2026

(54) WORK VEHICLE

(71) Applicant: Kubota Corporation, Osaka (JP)

(72) Inventors: Kazuhiro Tanaka, Sakai (JP); Michisuke Iga, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 19/221,681

(22) Filed: May 29, 2025

(65) Prior Publication Data

US 2025/0382924 A1 Dec. 18, 2025

(30) Foreign Application Priority Data

Jun. 13, 2024 (JP) ................................. 2024-095932

(51) Int. Cl.
*F02D 9/02* (2006.01)

(52) U.S. Cl.
CPC .......... *F02D 9/02* (2013.01); *F02D 2009/022* (2013.01); *F02D 2009/0235* (2013.01); *F02D 2200/101* (2013.01); *F02D 2200/50* (2013.01)

(58) Field of Classification Search
CPC ................. F02D 2009/022; F02D 9/02; F02D 2009/0235; F02D 2200/101
See application file for complete search history.

(56) References Cited

U.S. PATENT DOCUMENTS

2002/0137596 A1* 9/2002 Markyvech ........... F02D 41/023 477/83
2016/0146334 A1* 5/2016 Nelson ................ B60L 15/2054 701/22

FOREIGN PATENT DOCUMENTS

EP 1672238 A2 * 6/2006 ............ F16D 48/06
JP 2017155698 A 9/2017

* cited by examiner

*Primary Examiner* — Kevin A Lathers
(74) *Attorney, Agent, or Firm* — The Webb Law Firm

(57) ABSTRACT

A work vehicle includes an engine; a transmission device configured to adjust motive power from the engine; a centrifugal clutch between the engine and the transmission device; and a throttle controller configured to electronically control an opening degree of a throttle valve of the engine, the throttle controller including a filter value deriver configured to derive an opening degree filter value from an engine rotational speed of the engine and the opening degree, the throttle controller being configured to electronically control the opening degree with use of the opening degree filter value, the filter value deriver being configured to derive a first opening degree filter value for decreasing throttle responsiveness of the engine under a derivation condition of the engine rotational speed being not higher than a centrifugal clutch connection rotational speed of the centrifugal clutch.

4 Claims, 5 Drawing Sheets

| Current accelerator opening degree (%) \ Engine rotational speed (rpm) | 1000 | 1500 | 1800 | 2000 | 2250 | 3000 | 4000 | 5000 | 6000 |
|---|---|---|---|---|---|---|---|---|---|
| 0 | α11 | α12 | α13 | α14 | α15 | α16 | α17 | α18 | α19 |
| 20 | α21 | α22 | α23 | α24 | α25 | α26 | α27 | α28 | α29 |
| 40 | α31 | α32 | α33 | α34 | α35 | α36 | α37 | α38 | α39 |
| 60 | α41 | α42 | α43 | α44 | α45 | α46 | α47 | α48 | α49 |
| 80 | α51 | α52 | α53 | α54 | α55 | α56 | α57 | α58 | α59 |
| 100 | α61 | α62 | α63 | α64 | α65 | α66 | α67 | α68 | α69 |

WORK VEHICLE

CROSS-REFERENCE TO RELATED APPLICATION

This application claims priority to Japanese Patent Application No. 2024-095932 filed Jun. 13, 2024, the disclosure of which is hereby incorporated by reference in its entirety.

BACKGROUND OF THE INVENTION

Field of the Invention

The present invention relates to a work vehicle including an engine, a transmission device, a centrifugal clutch between the engine and the transmission device, and a throttle mechanism for electronic control.

Description of Related Art

JP 2017-155698 A discloses a utility vehicle including an engine, a gear shift device configured to adjust motive power from the engine in response to a shift, and a centrifugal clutch between the engine and the gear shift device. The utility vehicle is configured to, in response to determining that the gear shift device is coupled incompletely, reduce the amount of fuel to be supplied to the engine to below a reference value to prevent gear noise.

The utility vehicle disclosed in JP 2017-155698 A determines whether the gear shift device is coupled incompletely on the basis of a detection signal from a coupling state detection sensor, and if the gear shift device is coupled incompletely, reduces an increase in the engine rotational speed in response to an operation of the accelerator for high speed, thereby preventing gear noise. The utility vehicle does not reduce an increase in the engine rotational speed when the gear shift device is coupled completely, unfortunately letting the driver be still disturbed by an impact caused by connection of the centrifugal clutch.

SUMMARY OF THE INVENTION

In view of the above circumstances, the present invention has an object of providing a work vehicle that does not let the driver be disturbed at the time of connection of a centrifugal clutch.

A work vehicle according to the present invention includes: an engine; a transmission device configured to adjust motive power from the engine; a centrifugal clutch between the engine and the transmission device; and a throttle controller configured to electronically control an opening degree of a throttle valve of the engine, the throttle controller including a filter value deriver configured to derive an opening degree filter value from an engine rotational speed of the engine and the opening degree, the throttle controller being configured to electronically control the opening degree with use of the opening degree filter value, the filter value deriver being configured to derive a first opening degree filter value for decreasing throttle responsiveness under a derivation condition of the engine rotational speed being not higher than a centrifugal clutch connection rotational speed of the centrifugal clutch.

The above configuration sets low throttle responsiveness if the engine rotational speed is not higher than the centrifugal clutch connection rotational speed of the centrifugal clutch, that is, if the centrifugal clutch is not connected. This reduces an impact (that is, disturbance for the driver) caused by the centrifugal clutch becoming connected as a result of a rapid increase in the engine rotational speed when the work vehicle starts to travel.

Setting low throttle responsiveness at and around the engine idling rotational speed, which is lower than the centrifugal clutch connection rotational speed, will slow the response of the work vehicle in starting to travel, making it impossible for the driver to start driving the work vehicle as intended. This means that it is preferable to set low throttle responsiveness at predetermined low engine rotational speeds, for example, within a range of engine rotational speeds higher than the idling rotational speed and not higher than the centrifugal clutch connection rotational speed of the centrifugal clutch. The work vehicle may thus be further configured such that the filter value deriver is configured to, under a condition of the engine rotational speed being not lower than an idling rotational speed of the engine and not higher than the centrifugal clutch connection rotational speed, derive a second opening degree filter value for decreasing the throttle responsiveness as compared to a third opening degree filter value derived under another condition. This configuration slows a change in the opening degree of the throttle in the opening direction in response to the engine rotational speed approaching the centrifugal clutch connection rotational speed, thereby reducing the disturbance caused by clutch connection. Setting an appropriate opening degree filter value achieves a good balance between the responsiveness of the engine and impactful behavior at the start of travel. The above configuration also allows the clutch to be connected appropriately when the driver, who is pressing the foot brake with the right foot to stop the work vehicle on an uphill slope, moves the right foot to the accelerator pedal and presses the accelerator pedal. This prevents the work vehicle from moving rearward and downhill at the start of travel on a sloping road.

The opening degree filter value, so-called degree of smoothing, for adjusting the throttle responsiveness should preferably be based on the engine rotational speed and the opening degree of the throttle valve. The filter value deriver is thus in the form of an experimentally and empirically determined operation expression or a three-dimensional map (lookup table) based on the engine rotational speed, the opening degree of the throttle valve, and the opening degree filter value. The filter value deriver should preferably be in the form of a three-dimensional map in view of the speed and load of computation. The relationship between the engine rotational speed, the opening degree of the throttle valve, and the opening degree filter value should preferably be at least partially adjusted depending on, for example, the personality of the work vehicle, a change of the work vehicle over time, and/or the driver's preferences. The work vehicle may thus be further configured such that the filter value deriver includes the three-dimensional map that is adjustable for partially or entirely based on the engine rotational speed, the opening degree, and the opening degree filter value.

A centrifugal clutch, which is configured to control motive power transmission with use of centrifugal force, has clutch properties that vary individually to a degree and that change over time. The work vehicle may thus be further configured such that the three-dimensional map is partially or entirely adjustable in accordance with a change in a property of the centrifugal clutch over time.

DESCRIPTION OF THE INVENTION

The description below deals with a utility vehicle as an example of the work vehicle according to the present invention. The description below of the utility vehicle refers to the drawings, which show arrow F to indicate the forward direction relative to the vehicle body, arrow B to indicate the backward direction relative to the vehicle body, arrow U to indicate the upward direction relative to the vehicle body, arrow D to indicate the downward direction relative to the vehicle body, arrow L to indicate the leftward direction relative to the vehicle body, and arrow R to indicate the rightward direction relative to the vehicle body.

Figure 1:
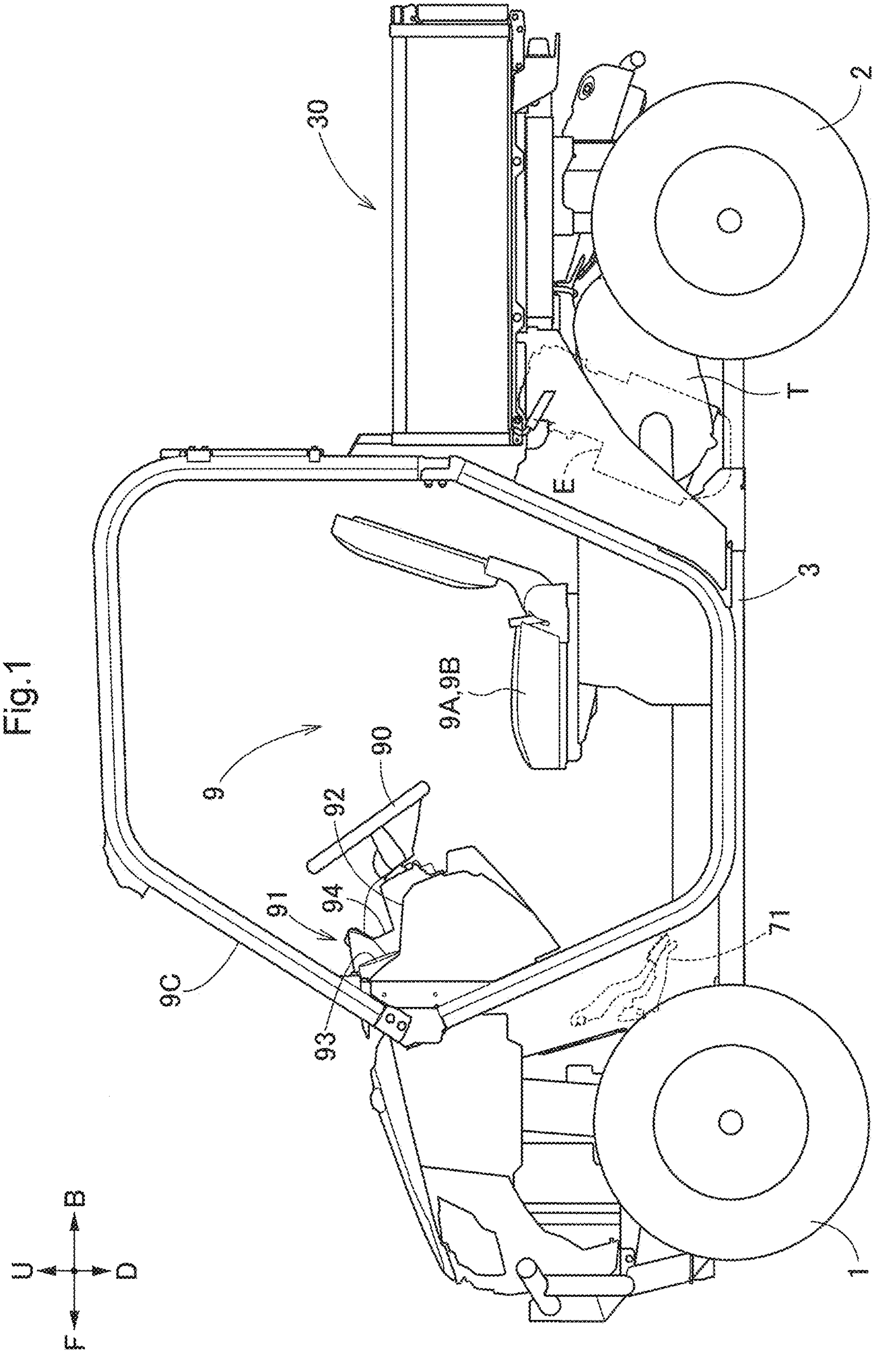
FIG. 1 is a left side view of a work vehicle.

FIG. 1 illustrates a utility vehicle including a pair of left and right drivable and turnable front wheels 1, a pair of left and right drivable rear wheels 2, and a body frame 3 supported by the front and rear wheels 1 and 2 on the ground. The utility vehicle includes a driver section 9 at a front portion of the body frame 3 and a cargo bed 30 at a rear portion of the body frame 3. The utility vehicle includes components such as an engine E and a transmission T below the cargo bed 30 and a roll-overprotective structure 9C covering the driver section 9.

Figure 2:
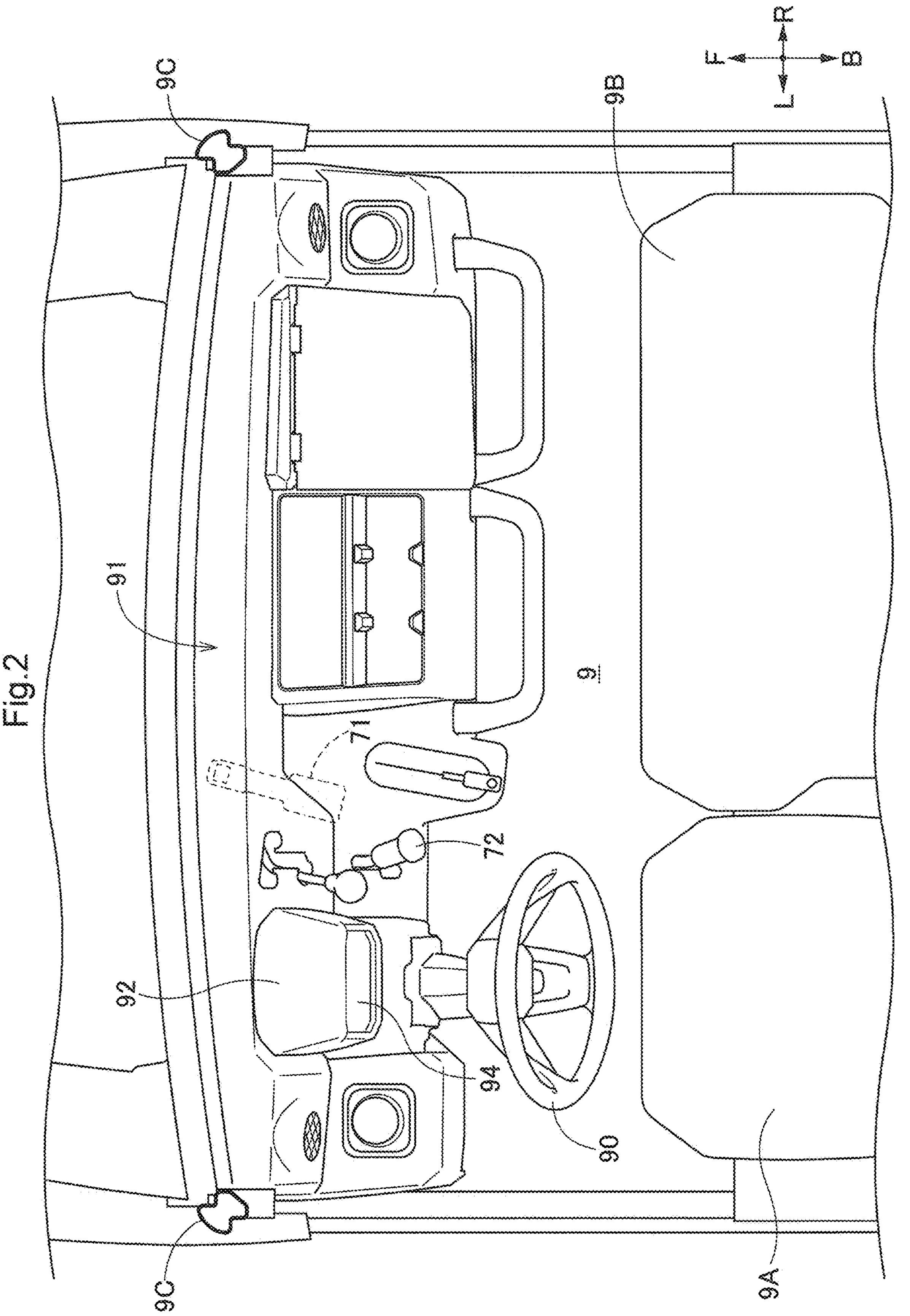
FIG. 2 is a plan view of a driver's seat, a passenger's seat, a dashboard, and their surroundings.

As illustrated in FIGS. 1 and 2, the driver section 9 includes a driver's seat 9A and an occupant's seat 9B. The driver section 9 includes a steering wheel 90 forward of the driver's seat 9A and a dashboard 91 forward of the steering wheel 90 and including an instrument panel 92, which includes components such as a meter panel 93 as a display device, a touch screen 94 as a display device, and various operation buttons. The meter panel 93 and the touch screen 94 may be integral with each other. The driver section 9 includes human-operated sections such as an accelerator pedal 71 for use to adjust the travel speed, a shift lever 72 for use to shift gears, and a brake pedal (not illustrated in the drawings) for use to brake the utility vehicle.

Figure 3:
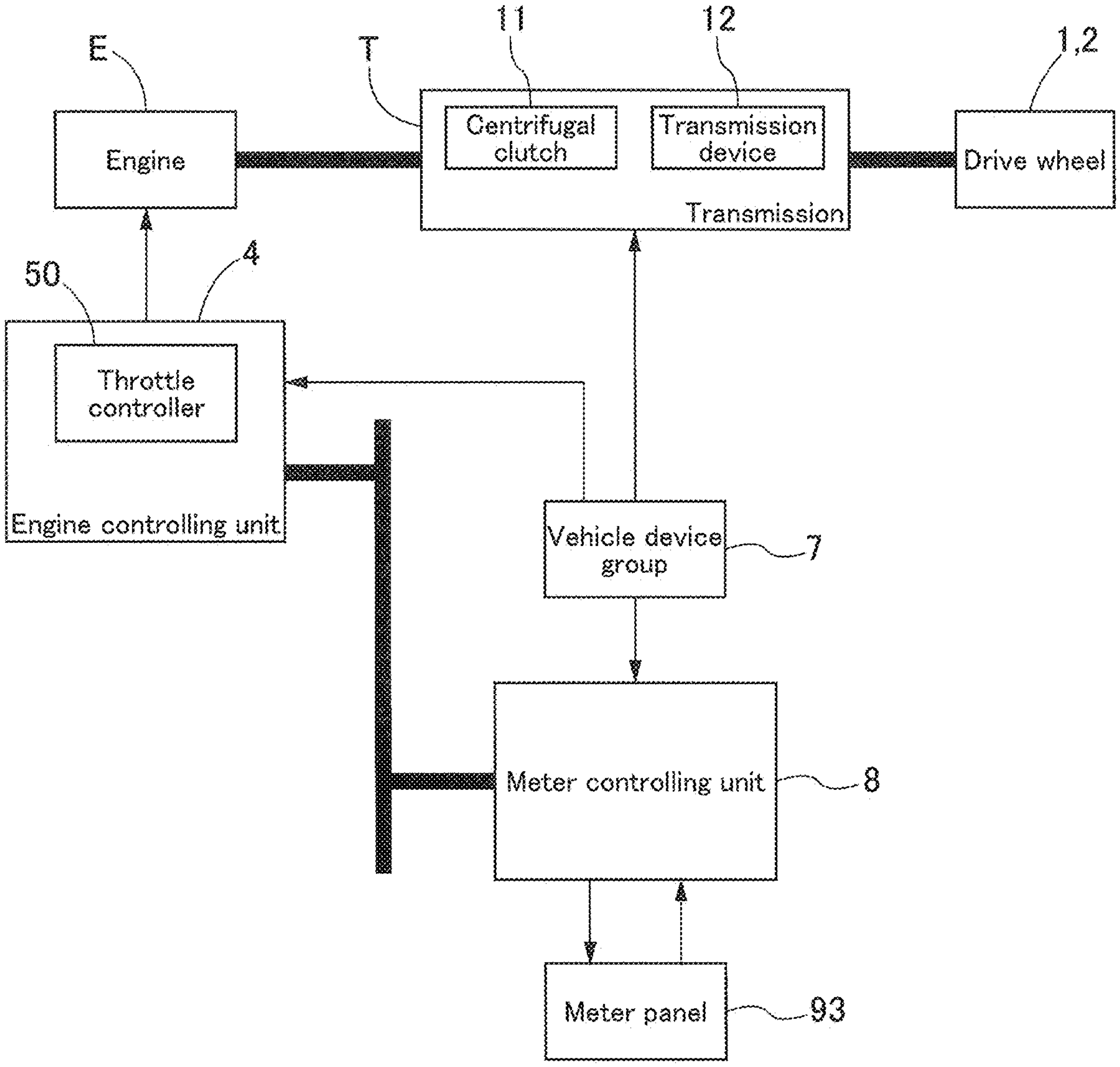
FIG. 3 is a functional block diagram schematically illustrating the respective functions of a control system and drive system of a work vehicle.

FIG. 3 is a functional block diagram schematically illustrating the respective functions of a drive system and control system of the work vehicle. The drive system includes an engine E and a transmission T configured to adjust motive power from the engine E and transmit the resulting motive power to the drive wheels, namely the front and rear wheels 1 and 2, as the work vehicle is configured to select between four-wheel drive and two-wheel drive. The transmission T includes a centrifugal clutch 11 configured to receive motive power from the engine E first and a transmission device 12 configured to adjust motive power from the centrifugal clutch 11. The centrifugal clutch 11 becomes start state to transmit motive power to the transmission device 12 in response to receiving from the engine E rotation motive power with a rotational speed not lower than a predetermined centrifugal clutch connection rotational speed, and becomes stop state no transmission of motive power in response to receiving from the engine E rotation motive power with a rotational speed lower than the centrifugal clutch connection rotational speed. The centrifugal clutch connection rotational speed is higher than the idling rotational speed for the drive system. The transmission device 12 for the present embodiment includes a belt-type continuously variable transmission device configured to receive motive power from the centrifugal clutch 11 and a gear shift device configured to receive adjusted motive power from the belt-type continuously variable transmission device. The transmission device 12 may be configured differently.

The control system includes as elements related to present embodiment an engine controlling unit 4 and a meter controlling unit 8 connected to each other over an in-vehicle local-area network. The engine controlling unit 4 is configured to transmit various control instructions to the engine E and its accessories and receive signals indicative of the state of the engine E detected by various sensors or the like such as an engine rotational speed. The engine controlling unit 4 includes a throttle controller 50 as a functional section particularly related to present embodiment.

The meter controlling unit 8 is configured to receive from various sensors included in a vehicle device group 7 detection signals indicative of such states as how the utility vehicle is driven, how the utility vehicle is operated, and the state of the driver, and notify the driver of the above states with use of various meters and lamps included in the meter panel 93 and the touch screen 94. The meter controlling unit 8 is also configured to receive operation signals from various operation switches included in the meter panel 93 and transmit the operation signals to the engine controlling unit 4 where necessary. The engine controlling unit 4 receives directly from the vehicle device group 7 some detection signals, for example, an operation signal indicative of an operation of the accelerator pedal 71.

Figure 4:
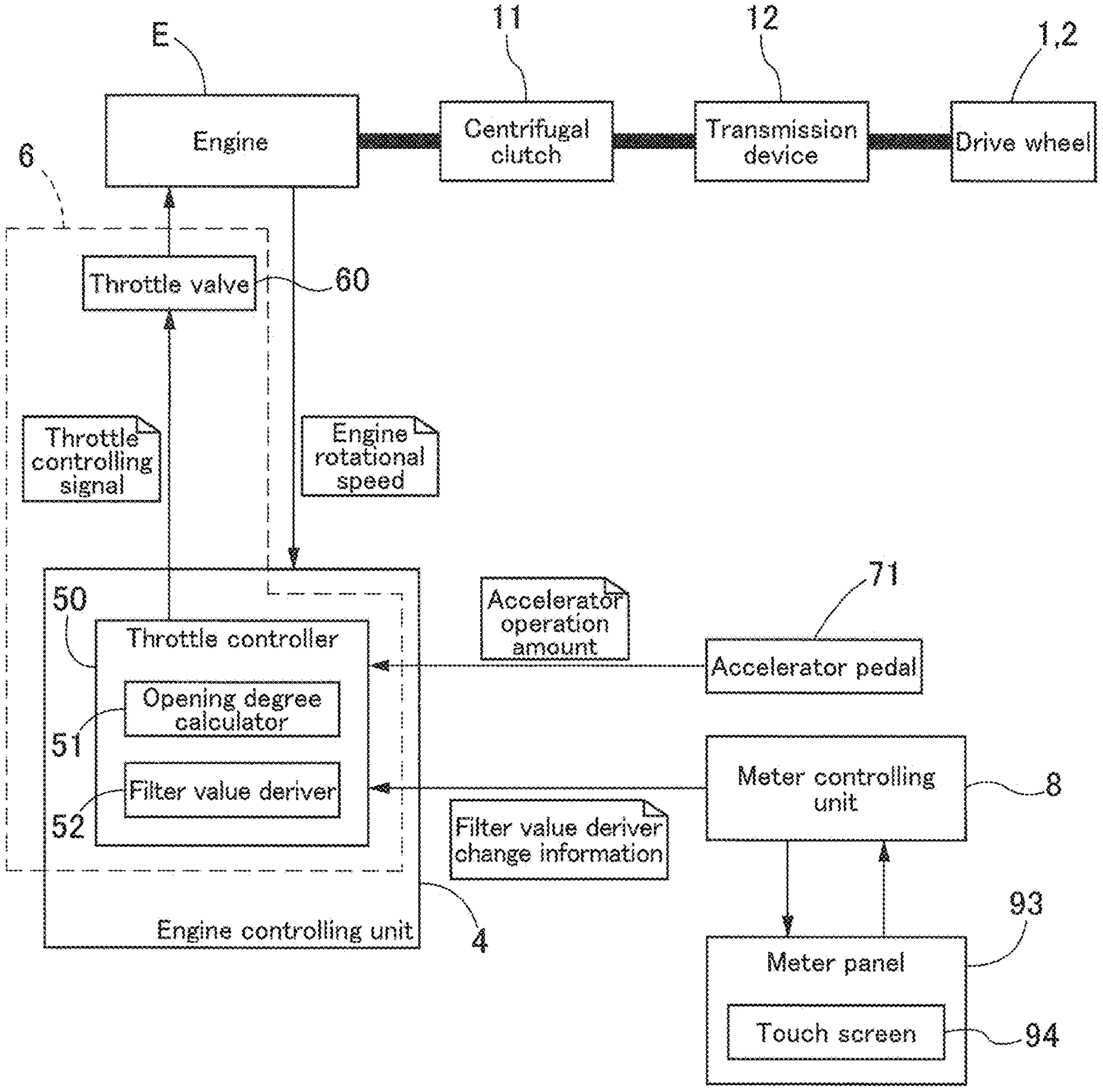
FIG. 4 is a diagram schematically illustrating the relationship between an engine controlling unit, a throttle mechanism, and an accelerator pedal.

FIG. 4 is a diagram schematically illustrating the relationship between the engine controlling unit 4, a throttle mechanism 6, and the accelerator pedal 71. The engine controlling unit 4 includes a throttle controller 50 configured to transmit to a throttle valve 60 of the engine E a throttle controlling signal for controlling the opening degree of the throttle valve 60 and receive an operation signal indicative of an operation of the accelerator pedal 71.

The throttle controller 50 is configured to electronically control the opening degree of the throttle valve 60 with use of an opening degree filter value based on the engine rotational speed and the current opening degree of the throttle valve 60. The throttle controller 50 includes an opening degree calculator 51 and a filter value deriver 52 for the electronic control. The throttle valve 60 and the throttle controller 50 constitute a throttle mechanism 6.

The throttle controller 50 is configured to generate a throttle controlling signal with use of an opening degree filter value (degree of smoothing). The opening degree of the throttle valve 60 decided based on an opening degree filter value, which decreases the throttle responsiveness under a particular condition. Specifically, the throttle controller 50 generates a throttle controlling signal with use of an opening degree filter value. The filter value deriver 52 is configured to derive an opening degree filter value (a first opening degree filter valuer) for decreasing the throttle responsiveness under a predetermined particular derivation condition, that is, if the engine rotational speed is not higher than the centrifugal clutch connection rotational speed of the centrifugal clutch 11, preferably, if the engine rotational speed is not lower than the idling rotational speed and not higher than the centrifugal clutch connection rotational speed. In other words, the filter value deriver 52 is configured to, if the engine rotational speed is not lower than the idling rotational speed and not higher than the centrifugal clutch connection rotational speed, derive an opening degree filter valuer (a second opening degree filter valuer) for decreasing the throttle responsiveness as compared to an opening degree filter value (a third opening degree filter valuer) derived under another condition.

Figure 5:
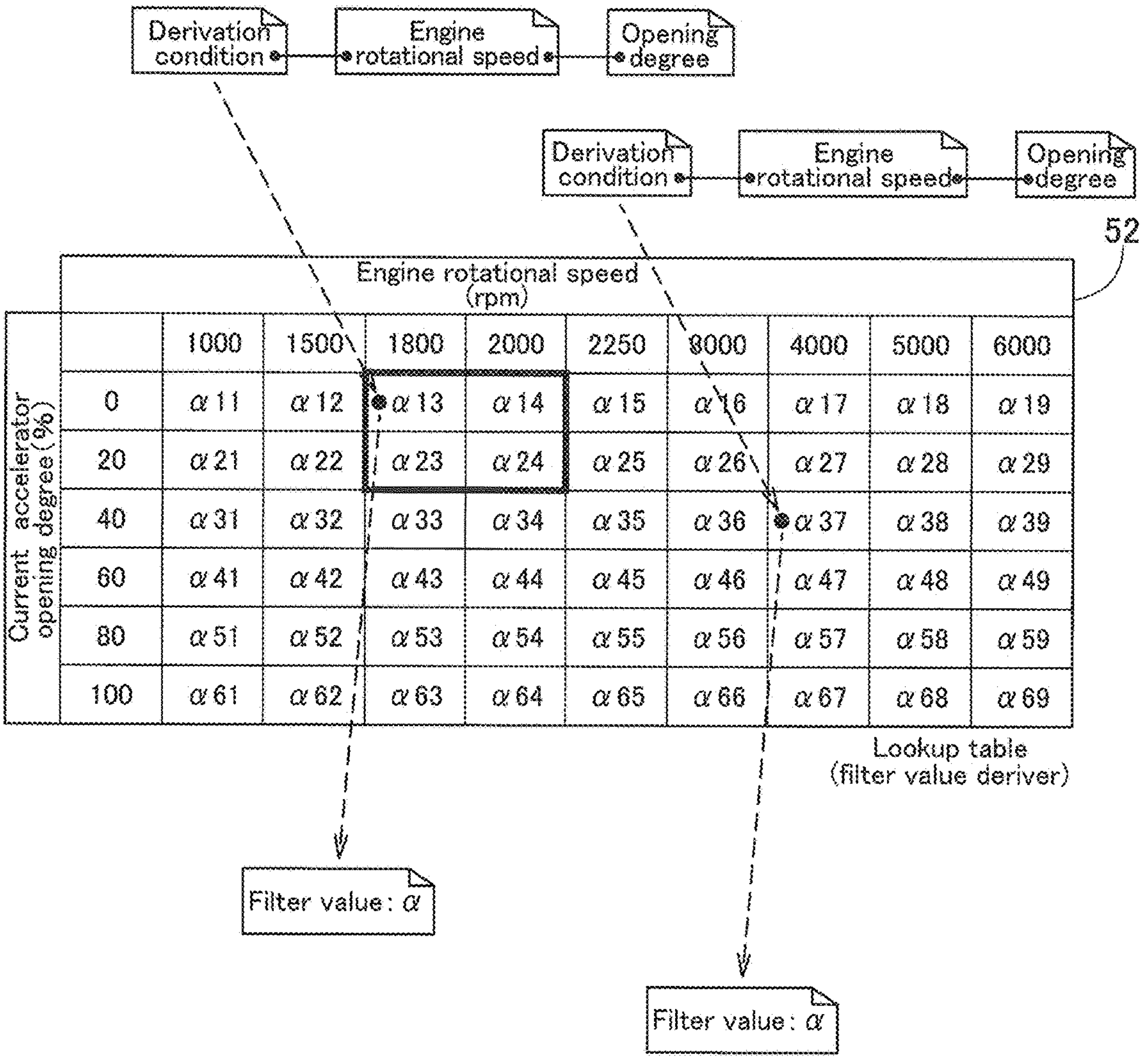
FIG. 5 is a diagram schematically illustrating a function of the filter value deriver.

As illustrated in FIG. 5, the filter value deriver 52 for the present embodiment is in the form of a lookup table with a three-dimensional map based on the rotational speed of the engine E, the opening degree of the throttle valve 60, and the opening degree filter value. The lookup table allows an opening degree filter value to be derived from the engine rotational speed and the current accelerator opening degree as derivation conditions. The present embodiment assumes that the idling rotational speed is 1500 rpm and that the centrifugal clutch connection rotational speed is 2300 rpm.

The lookup table shows each of the engine rotational speed and the accelerator opening degree with discrete numerical values, that is, values in distinct stages, and accordingly assigns to the distinct stages opening degree filter values to be derived. The stages in FIG. 5 are mainly for an illustrative purpose; the lookup table may have any stages. The filter value deriver 52 may be in the form of, instead of a lookup table, a derivation formula for calculating substantially continuous opening degree filter values.

The lookup table in FIG. 5 shows opening degree filter values (indicated with sign a in FIG. 5) as 6×9 matrix values, which include matrix values inside the bold rectangle (degree of smoothing partial matrix) as opening degree filter values for decreasing the throttle responsiveness as compared to the other opening degree filter values. The lookup table, in other words, allows derivation of opening degree filter values $\alpha 13$, $\alpha 14$, $\alpha 23$, and $\alpha 24$ for decreasing the throttle responsiveness if the engine rotational speed is not less than 1800 rpm and less than 2250 rpm, and the current accelerator opening degree is not less than 0% and less than 40%.

Figure 6:
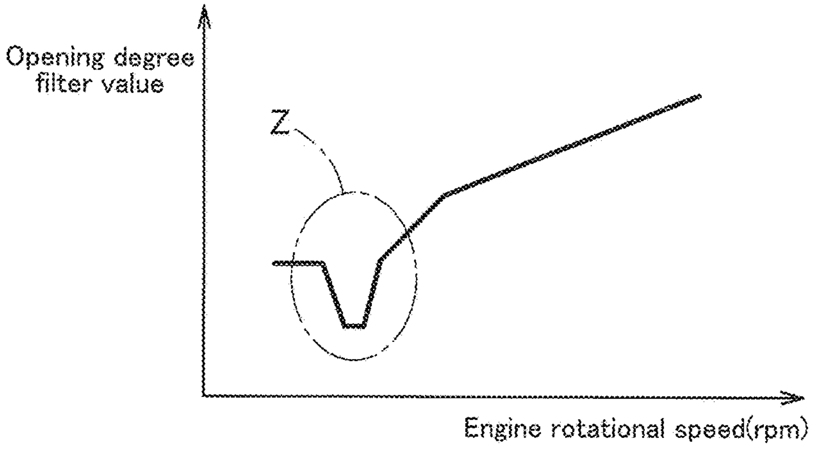
FIG. 6 is a graph indicative of the relationship between an engine rotational speed and a filter value.

FIG. 6 shows a graph indicative of the relationship between the engine rotational speed and the filter value. FIG. 6 shows sign Z for an oval area indicative of a drop corresponding to the matrix values inside the rectangle (degree of smoothing partial matrix) in FIG. 5.

The opening degree filter value, which is related to the throttle responsiveness, is an important factor for drivability. The relationship between the engine rotational speed, the opening degree of the throttle valve 60, and the opening degree filter value should thus preferably be at least partially adjusted depending on, for example, the personality of the utility vehicle, a change of the utility vehicle over time, and/or the driver's preferences. The lookup table for the present embodiment allows adjustment of the opening degree filter value and the range of the degree of smoothing partial matrix.

The centrifugal clutch 11, which is configured to control motive power transmission with use of centrifugal force, has clutch properties that vary individually and that change over time. In view of that, the lookup table for the present embodiment includes a three-dimensional map partially or entirely adjustable in accordance with a change in the properties of the centrifugal clutch 11 over time.

Alternative Embodiments (1) The embodiment described above is a utility vehicle as an example of the work vehicle. The present invention is also applicable to, for example, a mower, a snowmobile, or an off-road vehicle.

(2) The embodiment described above uses only the engine rotational speed and the opening degree of the throttle valve 60 as derivation conditions for deriving an opening degree filter value. The derivation conditions may further include such factors as weather, the state of the travel surface, and geographical characteristics.

The arrangements disclosed for the above embodiments (including the alternative embodiments) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

INDUSTRIAL APPLICABILITY

The present invention is applicable to a work vehicle including an engine, a motive power transmission path extending from the engine, and a centrifugal clutch on the motive power transmission path.

REFERENCE SIGNS LIST

4 Engine controlling unit
6 Throttle mechanism
8 Meter controlling unit
11 Centrifugal clutch
12 Transmission device
30 Cargo bed
50 Throttle controller
51 Opening degree calculator
52 Filter value deriver
60 Throttle valve
71 Accelerator pedal
72 Shift lever
E Engine
T Transmission

The invention claimed is:

1. A work vehicle, comprising:

an engine;

a transmission device configured to adjust motive power from the engine;

a centrifugal clutch between the engine and the transmission device; and a throttle controller configured to electronically control an opening degree of a throttle valve of the engine, and wherein:

the throttle controller comprises a filter value deriver configured to derive an opening degree filter value from an engine rotational speed of the engine and the opening degree, the throttle controller is configured to electronically control the opening degree with use of the opening degree filter value, and the filter value deriver is configured to derive a first opening degree filter value for decreasing throttle responsiveness under a derivation condition of the engine rotational speed being not higher than a centrifugal clutch connection rotational speed of the centrifugal clutch.

2. The work vehicle according to claim 1, wherein:

the filter value deriver is configured to, under a condition of the engine rotational speed being not lower than an idling rotational speed of the engine and not higher than the centrifugal clutch connection rotational speed, derive a second opening degree filter value for decreasing the throttle responsiveness as compared to a third opening degree filter value derived under another condition.

3. The work vehicle according to claim 1, wherein:

the filter value deriver comprises a partially or entirely adjustable three-dimensional map based on the engine rotational speed, the opening degree, and the opening degree filter value.

4. The work vehicle according to claim 3, wherein:

the three-dimensional map is partially or entirely adjustable in accordance with a change in a property of the centrifugal clutch over time.

* * * * *